（12） United States Patent
Jeon et al.

(10) Patent No.: US 10,129,693 B2
(45) Date of Patent: Nov. 13, 2018

(54) SYSTEM OF REAL-TIME SHARING SCRIBBLING AND TRACKING INFORMATION BASED ON MAP AND OPERATING METHOD THEREOF

(71) Applicant: PAPAYA CORPORATION, Incheon (KR)

(72) Inventors: Young Jun Jeon, Seongnam-si (KR); Won Ik Choi, Incheon (KR)

(73) Assignee: PAPAYA CORPORATION, Incheon (KR)

(*) Notice: Subject to any disclaimer, the term of this patent is extended or adjusted under 35 U.S.C. 154(b) by 0 days.

(21) Appl. No.: 15/235,146

(22) Filed: Aug. 12, 2016

(65) Prior Publication Data
US 2017/0374507 A1 Dec. 28, 2017

(30) Foreign Application Priority Data
Jun. 22, 2016 (KR) ........................ 10-2016-0078129

(51) Int. Cl.
H04W 4/02 (2018.01)
H04W 4/14 (2009.01)
H04M 1/725 (2006.01)
H04W 4/021 (2018.01)
H04W 4/80 (2018.01)

(52) U.S. Cl.
CPC ......... *H04W 4/021* (2013.01); *H04M 1/7255* (2013.01); *H04M 1/72552* (2013.01); *H04W 4/027* (2013.01); *H04W 4/14* (2013.01); *H04W 4/80* (2018.02)

(58) Field of Classification Search
CPC ......... H04W 4/185; H04W 4/08; H04W 4/02; H04W 4/021; H04W 4/008; H04W 4/027; H04W 4/14; H04M 1/7255; H04M 1/72552

See application file for complete search history.

(56) References Cited

U.S. PATENT DOCUMENTS

| 2010/0082247 A1* | 4/2010 | Klein | G01C 21/20 701/533 |
| 2012/0302256 A1* | 11/2012 | Pai | H04W 4/02 455/456.2 |
| 2014/0067950 A1* | 3/2014 | Winograd | H04L 67/306 709/204 |
| 2014/0351351 A1* | 11/2014 | Yu | H04L 51/32 709/206 |
| 2015/0293926 A1* | 10/2015 | Yang | H04W 4/02 707/610 |

FOREIGN PATENT DOCUMENTS

KR 10-1497994 B1 3/2015

* cited by examiner

*Primary Examiner* — Georg Eng
*Assistant Examiner* — Umair Ahsan
(74) *Attorney, Agent, or Firm* — Novick, Kim & Lee, PLLC; Jae Youn Kim

(57) ABSTRACT

A system of real-time tracking with scribbling information based on a map and an operating method thereof which share multimedia contents information inserted into a selected tracking course of an electronic map while communicating with a counterpart and write an experience and information acquired in a corresponding region as the multimedia contents to share designed tracking course information with the counterpart and allow each counterpart to additionally write multimedia information in designed contents information in person to share the multimedia information.

4 Claims, 11 Drawing Sheets

SYSTEM OF REAL-TIME SHARING SCRIBBLING AND TRACKING INFORMATION BASED ON MAP AND OPERATING METHOD THEREOF

CROSS-REFERENCE TO RELATED APPLICATIONS

This application claims priority to and the benefit of Korean Patent Application No. 10-2016-0078129 filed in the Korean Intellectual Property Office on Jun. 22, 2016. the entire contents of which are incorporated herein by reference.

BACKGROUND OF THE INVENTION

1. Field of the Invention

The present invention relates to a system of real-time sharing tracking with scribbling information based on a map and an operating method thereof, and more particularly, to a system of real-time tracking with scribbling information based on a map and an operating method thereof which share multimedia contents information including a scribbling, a memo, recording, a video, and the like inserted into a selected tracking course of an electronic map while communicating with a counterpart and write an experience and information acquired in a corresponding region as a photograph, an image, a text, the memory, and the scribbling to share designed tracking course information with the counterpart through the message, an e-mail, SNS, and the like and allow each counterpart to additionally write multimedia information in designed contents information in person to share the contents information with the multimedia information with another counterpart.

2. Description of Related Art

In recent years, with rapid development of electronic, communication, component, and production technologies, mobile communication portable terminals having high performance have been actively developed and further, while a production increases by an increase in demand in which each person intends to possess the mobile communication portable terminals, portable terminals having more excellent performance than low price can be easily secured.

Mobile communication is a service a registered portable terminal communicates with the counterpart through an immediate wireless access at anytime and anywhere while arbitrarily moving in a service region formed by a mobile communication system and small-size and small-weight development of the portable terminal has been continuously progressed.

The portable terminal is carried for 24 hours for communication when and where is not known to be generated, but a time when a voice signal is used to be directly used is very short, and as a result, in order to solve a problem in that utilization is very low, the portable terminal is developed and supplied while including additional functions of SMS, MMS, phone number management, a TV, a recorder, a calculator, a camera, a GPS, and the like and in recent years, a smart phone having a small-sized computer function which is added has been developed and there is a trend that mobile convergence including other independent functions including a form to which a mobile communication function is added to a PDA, a tablet PC, and the like, medical examination, and the like have been developed.

Meanwhile, a destination or a specific region is generally searched by using an electronic map in a desktop PC. and the like, but a specific destination needs to be searched by directly inputting meta information (as an example, a place name, coordinate information, a scale, and the like) in the portable terminal such as the smart phone, and the like.

The related art by the requirement provides "Multimedia Map Service System and Method for Providing Same" of Korean Patent Registration No. 10-1497994.

FIG. 1 is a functional configuration diagram of a system for providing multimedia map spatial information according to an exemplary embodiment of the related art.

Hereinafter, the related art according to the exemplary embodiment is described in detail with reference to the accompanying drawings, the system is configured to include a portable terminal 100, a GPS 110, a PC 120, a service server 130, and a map server 140.

The portable terminal 100 includes an additional function unit performing photographing, a positional information extracting unit receiving positional information from the GPS 110, photo file data generated by the additional function unit, a storing unit linking and storing positional information at a photographing time, and a transmitting unit transmitting/receiving data to from the PC 120. The PC 120 performs a service such as Internet, or the like and uses an Internet service such as searching of blog or a personal homepage provided by the service server 130 by operating the PC 120.

Since the service server 130 provides a service that combines a photo file stored in the storing unit of the portable terminal 100 and data information such as the photographed positional information with the map data of the map server 140 and provides the combined photo file, data information, and map data through the Internet, it can be known at which point on the map the photo is picked up.

The related art allows at which point a specific photo is picked up to be known, but cannot provide various information regarding a specific position path on the map (electronic map).

Therefore, a technology needs to be developed, which links information experienced or acquired with respect a specific position or region in the electronic map with a designed template and shares or provides the information linked with the template with or to a specific counterpart on the SNS.

SUMMARY OF THE DISCLOSURE

The present invention has been made in an effort to provide a system for sharing scribbling and tracking information based on a map and a method for operating the same which insert contents information including scribbling, a memo, an image, recording, and the like in a tracking course selected in an electronic map while communicating with a specific counterpart to share the contents information inserted into the tracking course in real time or transmit the contents information inserted into the tracking course through a text message, an e-mail, SNS, and the like.

The present invention has also been made in an effort to provide a system for sharing scribbling and tracking information based on a map and a method for operating the same which additionally write learning or experiential information acquired by a user in tracking course information prepared by other person and configured by an electronic map and share the learning or experiential information with a counterpart which accesses through SNS, a message, and an e-mail service.

The present invention has also been made in an effort to provide a system for sharing scribbling and tracking information based on a map and a method for operating the same which write respective information acquired along a tracking course of an electronic map differently for each movement path and each time zone to sequentially search and verify the respective information according to the tracking course and the time zone.

According to exemplary embodiments of the present invention, it is advantageous in that contents information including scribbling, a memo, an image, recording, and the like written or inserted in a tracking course selected in an electronic map while communicating with a specific counterpart is shared with a counterpart or transmitted to the counterpart through a text message, an e-mail, SNS, and the like.

Further, according to the exemplary embodiments of the present invention, it is advantageous in that learning or experiential information acquired by a user is additionally written in tracking course information prepared by other person and configured by an electronic map and shared with the counterpart which accesses through the SNS, message, and e-mail service.

Meanwhile, according to the exemplary embodiments of the present invention, it is advantageous in that since respective information acquired along a tracking course of an electronic map is written differently for each movement path and each time zone to sequentially search and verify the respective information according to the tracking course and the time zone.

DETAILED DESCRIPTION

Figure 1:
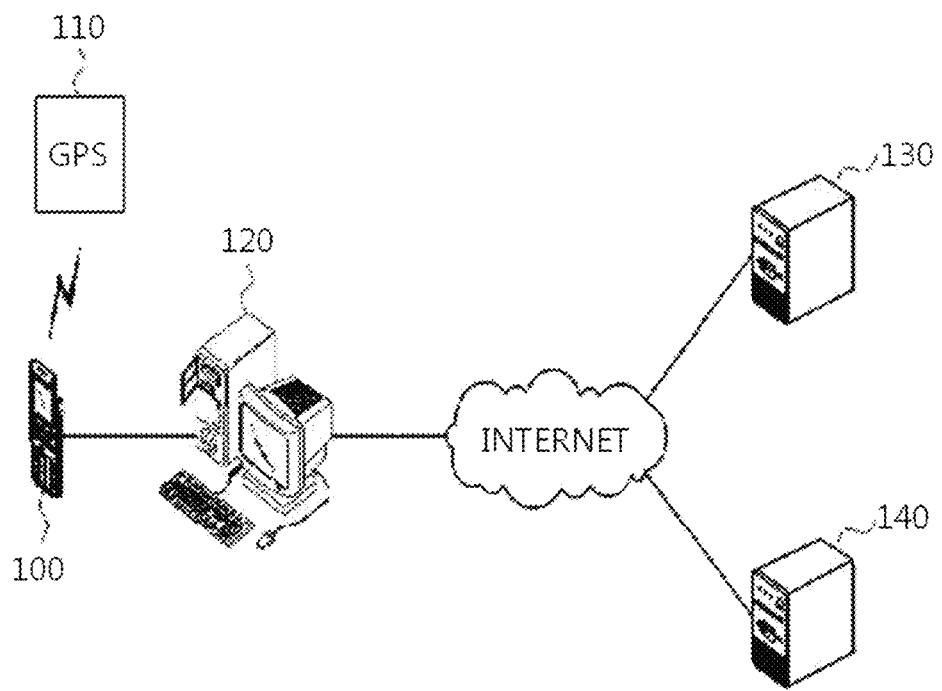
FIG. 1 is a functional configuration diagram of a system for providing multimedia map spatial information according to an exemplary embodiment of the related art.
Figure 2:
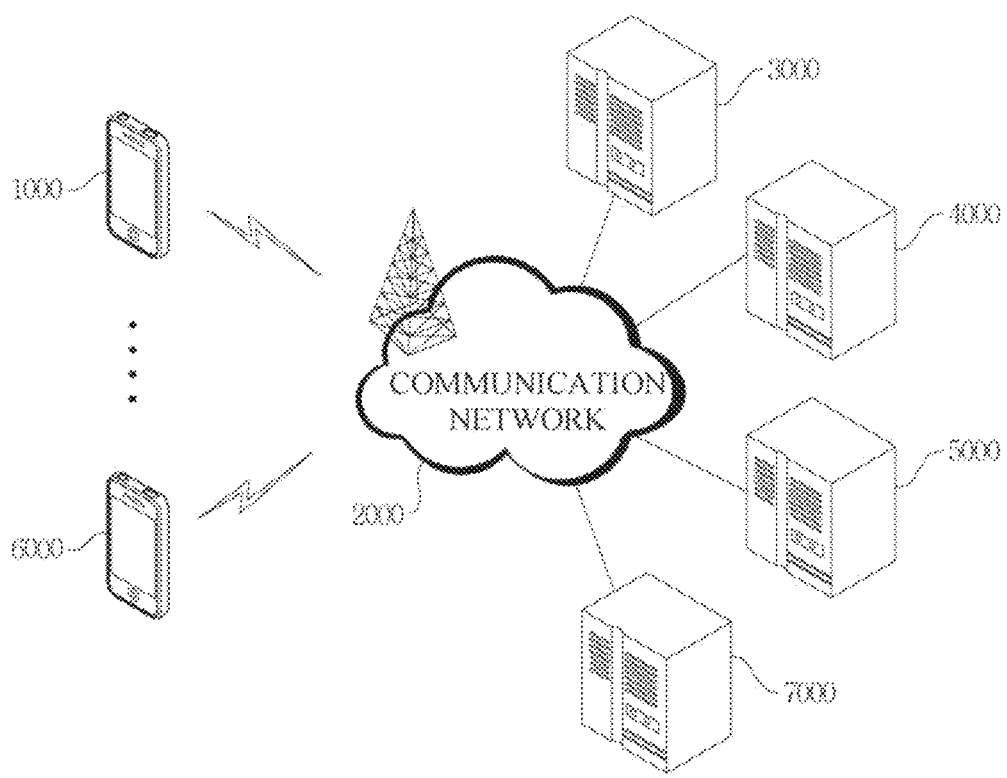
FIG. 2 is a functional configuration diagram for describing a system of real-time sharing scribbling and tracking information based on a map according to an exemplary embodiment of the present invention.
Figure 3:
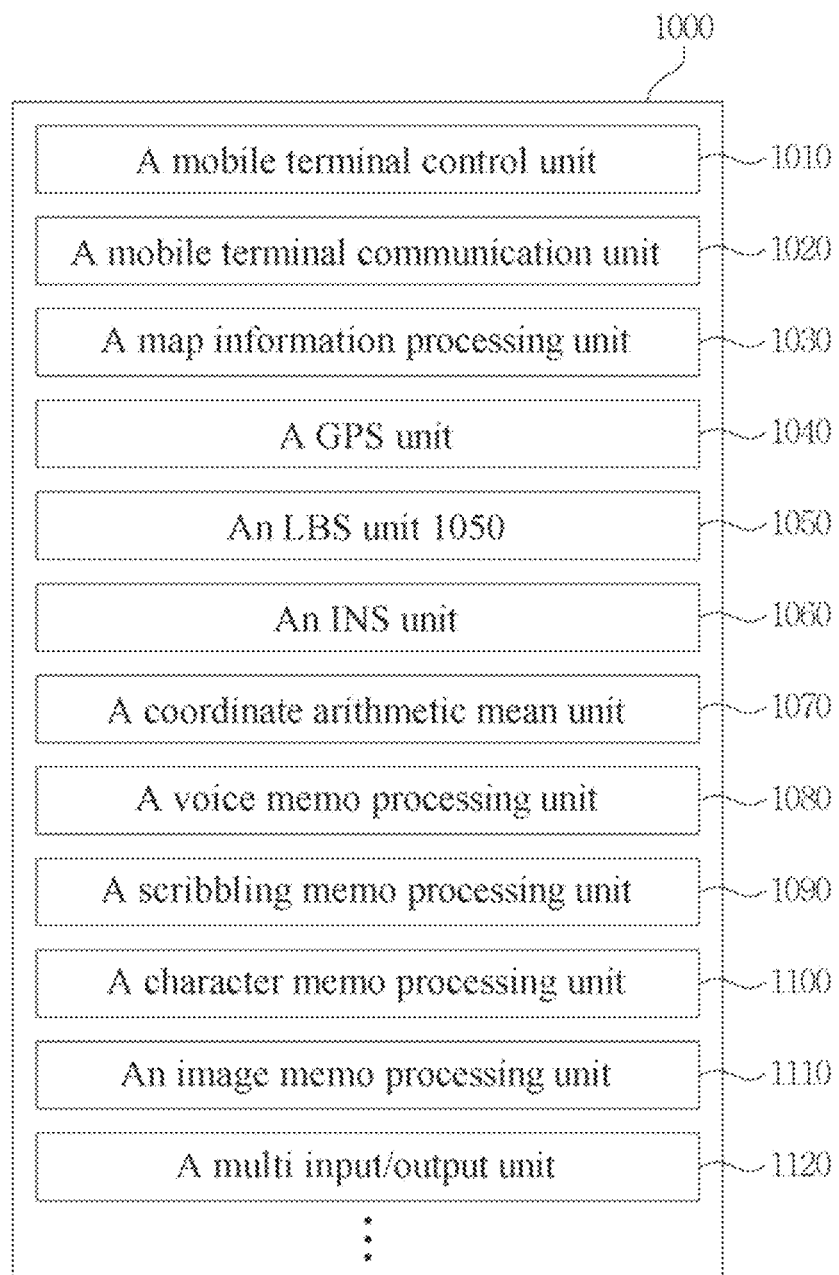
FIG. 3 is a detailed functional explanatory diagram of a mobile terminal including a master mobile terminal and a slave mobile terminal according to an exemplary embodiment of the present invention.
Figure 4:
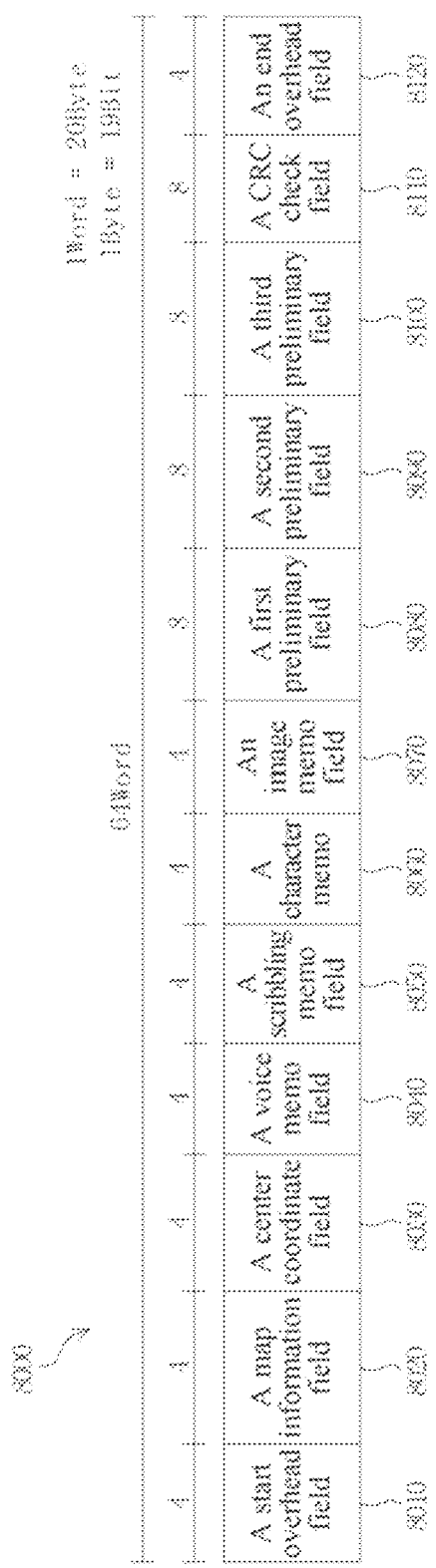
FIG. 4 is a configuration explanatory diagram of an interval memory information frame according to an exemplary embodiment of the present invention.
Figure 5:
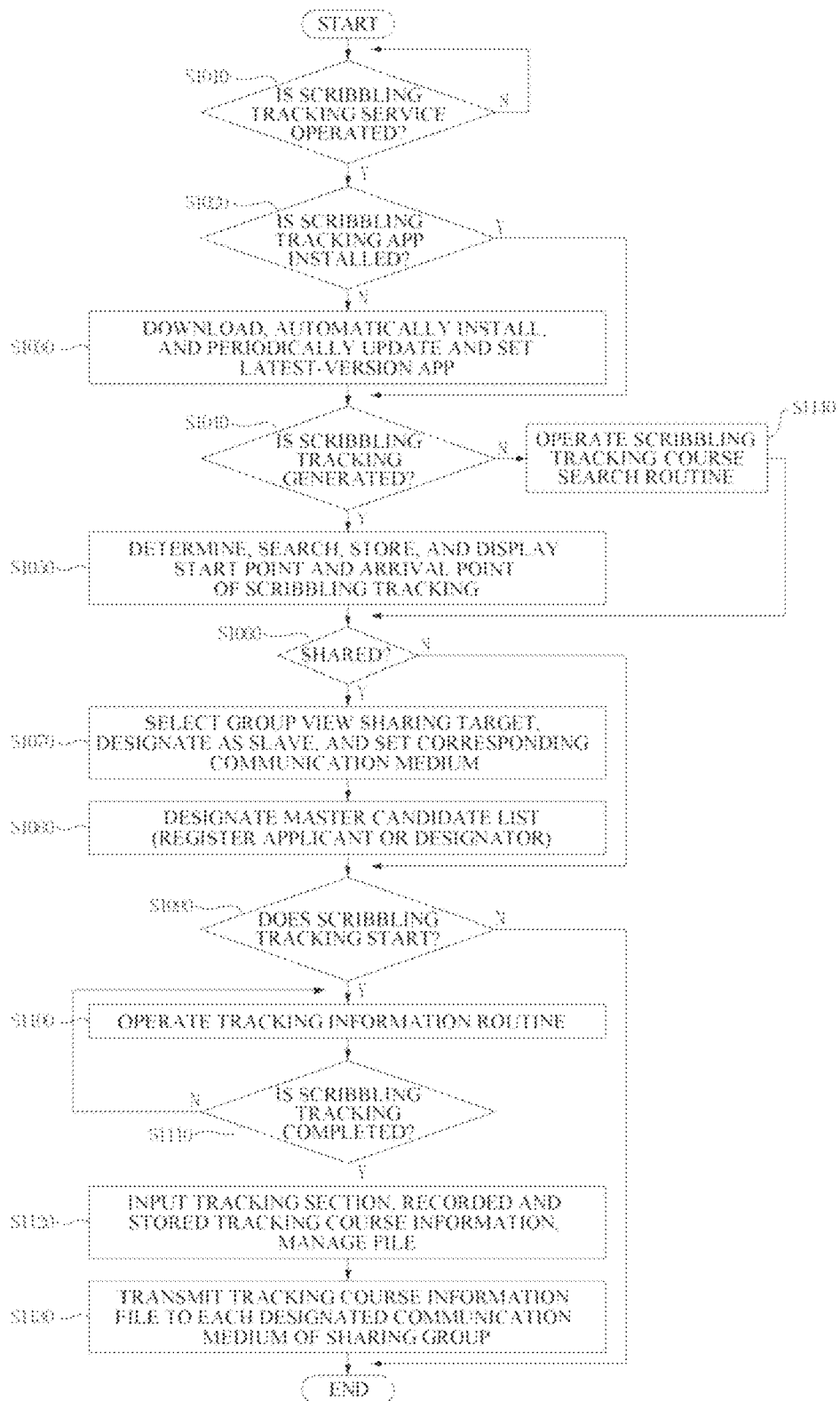
FIG. 5 is a functional configuration diagram for describing a system of real-time sharing scribbling and tracking information based on a map according to an exemplary embodiment of the present invention.
Figure 6:
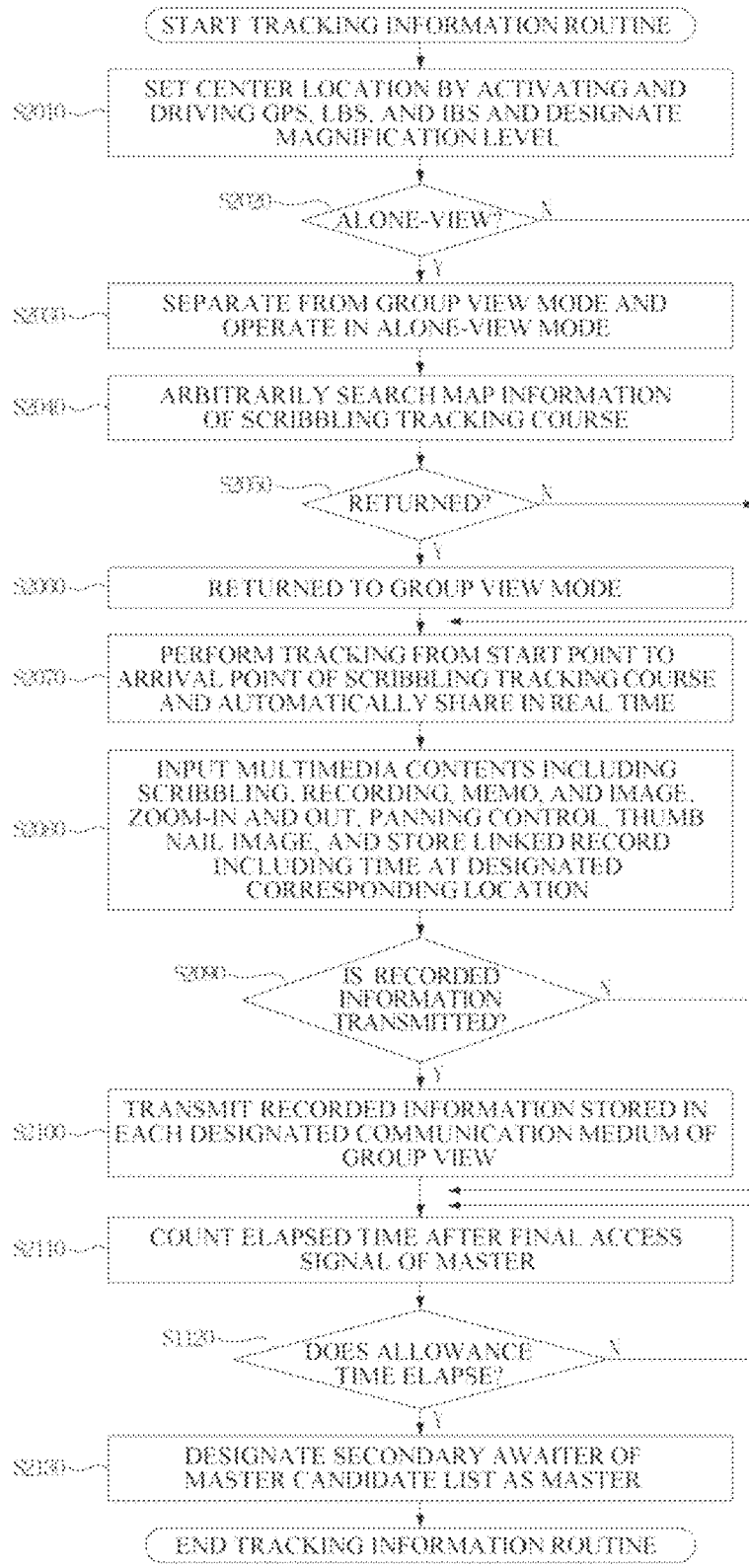
FIG. 6 is a flowchart for describing an operating method of a tracking information routine according to an exemplary embodiment of the present invention.
Figure 7:
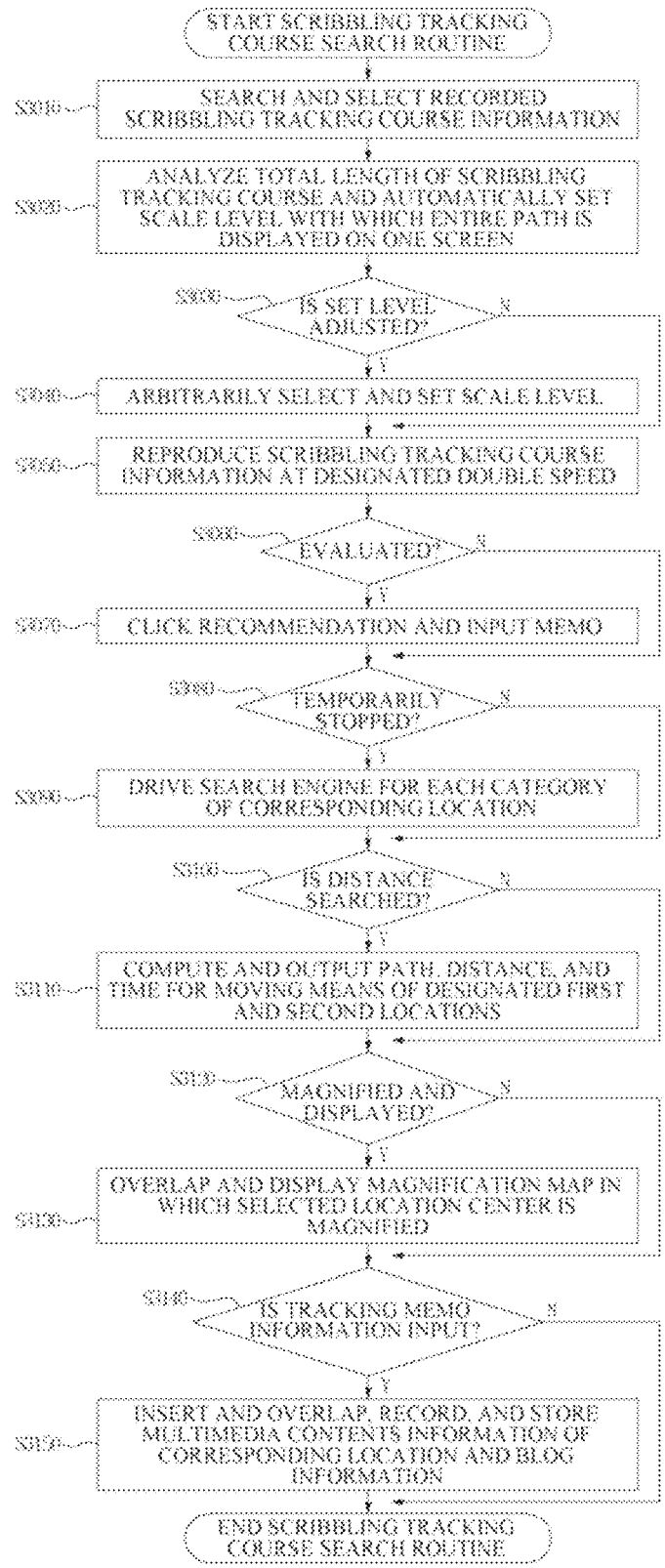
FIG. 7 is a flowchart for describing an operating method of a scribbling tracking information routine according to an exemplary embodiment of the present invention.

The present invention may have various modifications and various exemplary embodiments and specific exemplary embodiments will be illustrated in the drawings and described in detail in the detailed description. However, this is not intended to limit the present invention to the specific exemplary embodiments, and it should be understood that the present invention covers all the modifications, equivalents and replacements included in the spirit and technical scope of the present invention. In describing the present invention, when it is determined that the detailed description of the publicly known art related to the present invention may obscure the gist of the present invention, the detailed description thereof will be omitted.

Hereinafter, when the present invention is described in detail with reference all companying drawings, a system 900 of real-time sharing scribbling and tracking information based on a map is configured to include a master mobile terminal 1000, a communication network 2000, a map information server 3000, a tracking memo information server 4000, a communication path management server 5000, a slave mobile terminal 6000, and a mobile communication system server 7000.

In the following description, the master mobile terminal 1000 and the slave mobile terminal 6000 which have the same constitution and perform the same operation mobile terminals which communicate to wirelessly access a desired counterpart while moving with subscribing in a mobile communication system and either one of the master mobile terminal, the slave terminal, and a mobile terminal may be selectively used to be suitable for a context for describing the technical spirit of the present invention.

The master mobile terminal 1000 wirelessly downloads a scribbling tracking application (app) in a latest version and records, installs, and operates the latest-version scribbling tracking application and wirelessly downloads surrounding electronic map information having received and analyzed coordinate information of a current location at the center and records the surrounding electronic map information in an allocated region of a memory. The wireless downloading follows a known streaming scheme.

The app is a kind of an application program, is called even appl, applet, and the like, primarily means an application program used in a small-sized computer, and the like and since so many apps have been continuously developed and used so as to be used in various application fields, the apps have been named by developers or users and the app used in the present invention is referred to as a scribbling tracking app.

The master mobile terminal 1000 links any one or any one or more among tracking section memo information constituted by a voice memo, a scribbling memo, a character memo, and an image memo input through various interfaces including a microphone, a file, a text message, SNS, a touch panel, a camera, a scanner, Internet search, and the like with an corresponding location of the electronic map by the coordinate information and controls the corresponding tracking section memo information to be displayed as a corresponding thumb nail image and output by selection and records, stores, and manages the corresponding tracking section memo information.

The master mobile terminal 1000 and the slave mobile terminal 6000 have the same constitution including a mobile terminal control unit 1010, a mobile terminal communication unit 1020, a map information processing unit 1030, a GPS unit 1040, an LBS unit 1050, an INS unit 1060, a coordinate arithmetic mean unit 1070, a voice memo processing unit 1080, a scribbling memo processing unit 1090, a character memo processing unit 1100, an image memo processing unit 1110, and a multi input/output unit 1120.

The mobile terminal control unit 1010 controls and manages an overall operation of the master mobile terminal or the slave mobile terminal (hereinafter, referred to as "master mobile terminal") and outputs control signals to respective constituted function units and monitors operation slates of the respective function units.

In the following description, it will be described that the mobile terminal control unit 1010 operates by an activation operation of the scribbling tracking app. That is, it is described that the control and monitoring functions of the mobile terminal control unit 1010 is operated by the scribbling tracking app.

The mobile terminal communication unit 1020 simultaneously communicates by any one or any one or more selected among WiFi, Bluetooth, and Beacon schemes while performing mobile communication by a CDMA or WCDMA scheme by the corresponding control signal of the mobile terminal control unit 1010.

That is, it is described that the mobile terminal communication unit 1020 may include all communication function units including the CDMA scheme, the WCDMA scheme, the WiFi scheme, the Bluetooth scheme, the Beacon scheme, and a ZigBee scheme and operate all of the communication function units in an activation state simultaneously.

The map information processing unit 1030 accesses the map information server 3000 by the corresponding control signal of the mobile terminal control unit 1010 and downloads electronic map information by a streaming scheme and stores the electronic map information in an allocated region and controls and manages an electronic map of a zone included in a predetermined radius of a designated or input coordinate information center to be output and displayed at a designated magnification.

When the stored and managed electronic map information may not be used by changing the coordinate information, the electronic map of the zone (region) included in the predetermined radius of the coordinate information center is downloaded by automatically rapidly accessing the map information server 3000 and recorded, stored, and managed in the allocated region.

The GPS unit 1040 computes and outputs GPS coordinate information by receiving a GPS signal from a known GPS satellite by the corresponding control signal of the mobile terminal control unit 1010.

The LBS unit 1050 computes and outputs LBS coordinate information by receiving a known LBS signal from the mobile communication system server 7000 by the corresponding control signal of the mobile terminal control unit 1010.

The INS unit 1060 computes and outputs inertial navigation system (INS) coordinate information configured by an autonomously configured known mechanical constitution by the corresponding control signal of the mobile terminal control unit 1010.

The coordinate arithmetic mean unit 1070 inputs each of the GPS coordinate information, the LBS coordinate information, and the INS coordinate information by the corresponding control signal of the mobile terminal control unit 1010 and outputs mean coordinate information acquired by arithmetic mean-computing each input coordinate information as final corresponding coordinate information.

Herein, the mobile terminal control unit 1010 may limitatively activate any one or any one or more selected among the GPS unit 1040. the LBS unit 1050, and the INS unit 1060 and input values acquired by consecutively detecting the corresponding coordinate information 3 to 6 times at an interval of 0.1 second in the coordinate arithmetic mean unit 1070 and output a value acquired by arithmetic mean-computing the values as the corresponding coordinate information. In this case, determining as final corresponding coordinate information a value output by inputting the values acquired by consecutively detecting the corresponding coordinate information 3 times at the interval of 0.1 second in the coordinate arithmetic mean unit 1070 and by arithmetic mean-computing the detected values is preferable to reduce a total operation time. Since the output value is included in an error range of 0.5% or less in spite of further increasing the number of detection times, there is no significant difference.

The voice memo processing unit 1080 compresses the voice memo input through the corresponding interface by the corresponding control signal of the mobile terminal control unit 1010 and when the corresponding thumb nail image is selected, data is processed so that the compressed voice memo is linked with the corresponding thumb nail to be recorded while corresponding to the designated coordinate information and the voice memo is decompressed and output. Herein, it is described that the corresponding thumb nail image includes a mark to recognize the voice memo.

The scribbling memo processing unit 1090 compresses the scribbling memo input through the corresponding interface by the corresponding control signal of the mobile terminal control unit 1010 and when the corresponding thumb nail image is selected, data is processed so that the compressed scribbling memo is linked with the corresponding thumb nail to be recorded while corresponding to the designated coordinate information and the scribbling memo is decompressed and output. Herein, it is described that the corresponding thumb nail image includes a mark to recognize the scribbling memo and the scribbling memo means a script which is rapidly written, a symbol, a picture, and the like and may be input through scan or photographing.

The character memo processing unit 1100 compresses the character memo input through the corresponding interface by the corresponding control signal of the mobile terminal control unit 1010 and when the corresponding thumb nail image is selected, data is processed so that the compressed character memo is linked with the corresponding thumb nail to be recorded while corresponding to the designated coordinate information and the character memo is decompressed and output. Herein, it is described that the corresponding thumb nail image includes a mark to recognize the character memo and the character includes a text character input as a print or block letters.

The image memo processing unit 1110 compresses the image memo input through the corresponding interface by the corresponding control signal of the mobile terminal control unit 1010 and when the corresponding thumb nail image is selected, data is processed so that the compressed image memo is linked with the corresponding thumb nail to be recorded while corresponding to the designated coordinate information and the image memo is decompressed and output. Herein, it is described that the corresponding thumb nail image includes a mark to recognize the image memo and it is described that the video image includes a moving picture, a still image, a photographed image, a photographed picture, and all photographed images.

The multi-input/output unit 1120 inputs or outputs the a voice signal, a scribbling signal, a character signal, and a video signal by the corresponding control signal of the mobile terminal control unit 1010.

The master mobile terminal distributes and records the tracking section memo information in multiple field regions provided in a section memo information frame 8000 and encrypts the distributed and recorded tracking section memo information and transmits the encrypted tracking section memo information to the tracking memo information server 4000 and decrypts the received section memo information frame to extract the tracking section memo information.

Hereinafter, the section memo information frame 8000 will be described in detail again.

It is described that the communication network 2000 includes all known communication networks including a wired communication network including Internet, a wireless communication network including a mobile communication network and a wireless LAN, a dedicated communication network, a private communication network, and the like and the SNS.

The map information server 3000 accesses the master mobile terminal through the communication network and searches the surrounding electronic map at the received coordinate information center by a request and downloads and provides the surrounding electronic map by the streaming scheme.

The tracking memo information server 4000 accesses the master mobile terminal through the communication network, records and stores the tracking section memo information linked to the received electronic map information and the tracking section course information and coordinate information and displayed as the thumb nail in the allocated region, and outputs the recorded and stored the tracking section memo information by the request and search.

When the mobile terminal accesses the tracking memo information server 4000, whether the latest-version scribbling tracking app is installed and operated is automatically inspected and when the latest-version scribbling tracking app is not installed and operated, the tracking memo information server 4000 is configured to control and monitor the latest-version scribbling tracking app so that the latest-version scribbling tracking app is wirelessly downloaded, installed, and operated by the streaming scheme.

The communication path management server 5000 accesses the master mobile terminal through the communication network and configures and provides the communication path so that the tracking section memo information recorded in the tracking memo information server is transmitted to the designated mobile terminal by using any one or any one or more communication paths selected among the text message, the e-mail, and the SNS.

The slave mobile terminal 6000 accesses the master mobile terminal 1000 via the communication network 2000 and has the same constitution and performs the same operation as the master mobile terminal 1000 and receives the tracking section memo information via the communication path configured and provided by the communication path management server 5000 in real time by the corresponding control (signal) of the master mobile terminal 1000 or searches and verifies the tracking section memo information from the tracking memo information server 4000 and when the slave mobile terminal 1000 is designated as the master mobile terminal 1000, the slave mobile terminal 6000 generates new tracking section memo information and additionally writes the generated tracking section memo information in the designated coordinate information.

The mobile communication system server 7000 records, stores, and manages model names, model numbers, subscriber personal information, and corresponding financial information for multiple mobile terminals 1000 and 6000 and performs required corresponding control so that communication depending on movement of the mobile terminal is continued and controls the communication path and manages a communication fee and controls and manages an operation of the entire mobile communication network communication path control while verifying a current location of each mobile terminal in real time.

It is described that the section memo information frame 8000 is constituted by a total of 64 words and herein, 1 word is constituted by 20 bytes and 1 byte is constituted by 19 bits. Since the section memo information frame 8000 is an encryption process, a concern of hacking by other person is very less by arbitrarily selecting constitutions of the words and the bytes by a designer.

The section memo information frame 8000 is constituted by a total of 12 fields and each field is configured to include a start overhead field 8010, a map information field 8020, a center coordinate field 8030, a voice memo field 8040, a scribbling memo field 8050, a character memo field 8060, an image memo field 8070, a first preliminary field 8080, a second preliminary field 8090, a third preliminary field 8100, a CRC check field 8110, and an end overhead field 8120.

In the start overhead field 8010, information indicating a location where data of the section memo information frame 8000 starts, numbers of the data disclosed in the section memo information frame 8000, a serial number of the section memo information frame 8000, and address information (IP) address of a destination and via point information are included and disclosed.

The map information field 8020 may compress and disclose corresponding electronic map information of a tracking section or disclose a corresponding URL address to search the corresponding electronic map.

In the center coordinate field 8030, coordinate information finally computed and output by the mobile terminal and coordinate information corresponding to a map information (electronic map information) center representing the tracking section are recorded together corresponding time information.

In the voice memo field 8040, all voice-class memo signals input and recorded during the tracking section are recorded together with the corresponding time information.

In the scribbling memo field 8050, all scribbling memo signals input and recorded during the tracking section are recorded together with the corresponding time information.

In the character memo field 8060, all character memo signals input and recorded during the tracking section are recorded together with the corresponding time information.

In the image memo field 8070, all image memo signals input and recorded during the tracking section are recorded together with the corresponding time information.

In the first preliminary field 8080, the map information field 8020, the center coordinate field 8030, the voice memo field 8040, the scribbling memo field 8050, the character memo field 8060, and the image memo field 8070 are compressed and recorded.

In the second preliminary field 8090, the map information field 8020, the center coordinate field 8030, the voice memo field 8040, the scribbling memo field 8050, the character memo field 8060, and the image memo field 8070 are compressed and recorded and the same contents as the first preliminary field 8080 are recorded.

The third preliminary field 8100 is left a blank (space) for expendability.

In the CRC check field 8110, it is verified whether an error occurs in the data of the section memo information frame 8000 by a known CRC check scheme and the error is recovered when the error occurs and when it is impossible to recover the error, a recovery is attempted again by a known hamming code scheme and when it is impossible to recover the error even by the hamming code scheme, information is disclosed, which may transmit the section memo information frame 8000 having the corresponding serial number at a transmitting side by displaying a retransmission need signal. When the data of the section memo information frame 8000 is normal, the retransmission need signal is not disclosed.

In the end overhead field 8120, information indicating a location where the data of the section memo information frame 8000 ends and transmission destination information are included and disclosed.

Since disclosing information in the section memo information frame 8000 means encrypting the information, when a structure of the section memo information frame is not known, accurate information may not be extracted. Therefore, it is described that the mobile terminal control unit 1010 includes a function to perform encryption or decryption to the section memo information frame 8000.

Hereinafter, when the present invention is described in detail with reference all accompanying drawings, in an operating method of the system of real-time sharing scribbling and tracking information based on the map. which includes the master mobile terminal 1000, the communication network 2000, the map information server 3000, the tracking memo information server 4000, the communication path management server 5000, the slave mobile terminal 6000, and the mobile communication system server 7000, when the scribbling tracking service is operated by the master mobile terminal (S1010), it is verified whether the scribbling tracking app is installed and operated (S1020).

When it is determined that the scribbling tracking app is installed and operated by the mobile terminal control unit 1010 of the mobile terminal (S1020), the latest-version scribbling tracking app is wirelessly downloaded by the streaming scheme by accessing the tracking memo information server and recorded and stored in an allocated region and automatically installed and automatically set in an operation state (S1030).

Meanwhile, the mobile terminal control unit 1010 is configured so that a series of processes of wirelessly downloading the latest-version scribbling tracking app by the streaming scheme by accessing the tracking memo information server at 24:00 or 00:00 everyday is automatically performed by periods.

When the scribbling tracking course is generated by the master mobile terminal (S1040), a start point and an arrival point of the scribbling tracking course are determined and map information is searched and recorded and stored and output to be displayed (S1050).

When scribbling tracking course information generated by the master mobile terminal is shared with the slave mobile terminal in real time (S1060), the slave mobile terminal of a group view sharing target is designated or selected and designated or set as a slave and each designated or set so as to be connected to a communication path of a medium preferred or registered by each slave mobile terminal (S1070).

The master mobile terminal registers master candidate lists to be switched to the master mobile terminal among the slave mobile terminals in the order of a support target and a designation target and records and stores the master candidate lists in an autonomously allocated region and records, stores, and manages in the allocated region of the tracking memo information server (S1080).

When it is determined that scribbling tracking is started by the master mobile terminal (S1090), a tracking information routine is operated or executed (S1100). The tracking information routine will be described below in detail again.

When it is determined that the scribbling tracking is completed by the master mobile terminal (S1110), the tracking section memo information recorded in the scribbling tracking section is converted into the section memo information frame and recorded, stored, and managed in a memory region autonomously allocated by the unit of a file and controlled or requested to be recorded, stored, and managed in the tracking memo information server (S1120) and controlled to be transmitted to respective targets or members constituting a sharing group, respectively via the communication path by each designated medium of the slave mobile terminal (S1130).

Meanwhile, when it is determined that the scribbling tracking course is not generated by the master mobile terminal (S1040), a scribbling tracking course search routine is controlled and monitored to be operated (S1140). The scribbling tracking course search routine will be described below in detail again.

When the tracking information routine is described in detail, the mobile terminal control unit of the master mobile terminal outputs the coordinate information which is finally computed by activating and driving each of the GPS unit 1040, the LBS unit 1050, the INS unit 1060, and the coordinate arithmetic mean unit 1070, configures the output coordinate information as a center location of the electronic map, and designates a level value indicating a displayed magnification of the map (S2010).

That is, the GPS unit, the LBS unit, and the INS unit are activated and driven by the master mobile terminal and the computed coordinate information is configured to reach the center location of the output map information and transmitted to a group view target with a designated magnification and shared with the group view target.

When a level is not designated, a level to display an electronic map of an entire tracking section on one screen is automatically designated.

When the slave mobile terminal included in the group view target selects an alone-view (S2020). the alone-view is separated from a group view, and as a result, an alone-view mode is controlled and monitored to be operated (S2030) and the map information of the scribbling tracking course is requested to the map information server so as to be searched in the alone-view mode (S2040).

While the master mobile terminal is operated as a master, the alone-view mode may be operated, but a detailed description will be omitted.

When the slave mobile terminal is returned from the alone-view mode to the group view mode (S2050), since the alone-view mode ends and the alone-view mode is returned to the group view mode, a control state by the master mobile terminal is appreciated without modification (S2060).

The tracking is performed and shared in real time while moving from a start point to an arrival point of the scribbling tracking course by the master mobile terminal (S2070) and the multimedia contents including the scribbling, the recording, the memo, and the image are linked to the coordinate information and a summarized thumb nail image and recorded, stored, and managed (S2080).

When the information recorded by the master mobile terminal is intended to be transmitted to a sharing group (S2090), the recorded information stored in each designated communication medium of the sharing target included in the group view is transmitted (S2100).

Herein, it is described that the recorded information is recorded in the master mobile terminal and similarly recorded, stored, and managed in the tracking memo information server.

The mobile terminal control unit or the scribbling tracking app of the master mobile terminal counts an elapsed time after the master mobile terminal finally inputs information or inputs a control signal or an operation signal (S2110).

When the mobile terminal control unit or the scribbling tracking app counts that a first allowance time elapsed after a final access time when the master mobile terminal inputs the control signal, and the like (S2120), a secondary sharing target of the master candidate list is designated as the master (S2130) and the tracking information routine ends, and as a result, returning is performed.

When the scribbling tracking course search routine is described in detail, the scribbling tracking course information registered and managed in the tracking memo information server is searched and selected by the mobile terminal control unit of the master mobile terminal (S3010) and a level of a scale is automatically adjusted and set so that a total length of the selected scribbling tracking course is analyzed and the total length is wholly displayed in one multi input/output unit (S3020).

When the level set by the master mobile terminal is adjusted (S3030), the level of the scale is selected, set or adjusted as a predetermined value (S3040) and the information of the scribbling tracking course is reproduced at a predetermined double-speed (S3050).

When the tracking information is evaluated by the master mobile terminal, the slave mobile terminal, and other mobile terminal (S3060), a displayed recommendation button is clicked and a recommendation memo is input (S3070).

While tracking information which is recommended a lot is compensated by the tracking memo information server, the tracking information including a commercial advertisement may be disclosed.

When temporary play/stop is set by the master mobile terminal (S3080), a search engine which searches a periphery of the tracking course at a stopped location for each category is linked and driven (S3090).

When a distance of a predetermined section included in the scribbling tracking course is searched by the master mobile terminal (S3100), a path, a time, and a distance depending on moving means between a first location and a second location which are designated and input are computed and output (S3110).

Herein, when the moving means is different. a movement path may be different and there maybe a difference in movement time and movement distance.

When the master mobile terminal intends to magnify and display a specific region (S3120), a map of a magnification extended twice or more around coordinate information of a designated location is overlapped and displayed (S3130).

The magnification is preferably any one magnification or level selected among 2 to 10-time ranges and a 5-time magnification or level is most optimally preferable so as to accurately verify the corresponding location.

When the master mobile terminal inputs the tracking memo information in the specific region (S3140), multimedia contents information and blog information are selectively input and the input information is overlapped and recorded when the input information is displayed to be temporally divided (S3150).

Figure 8:
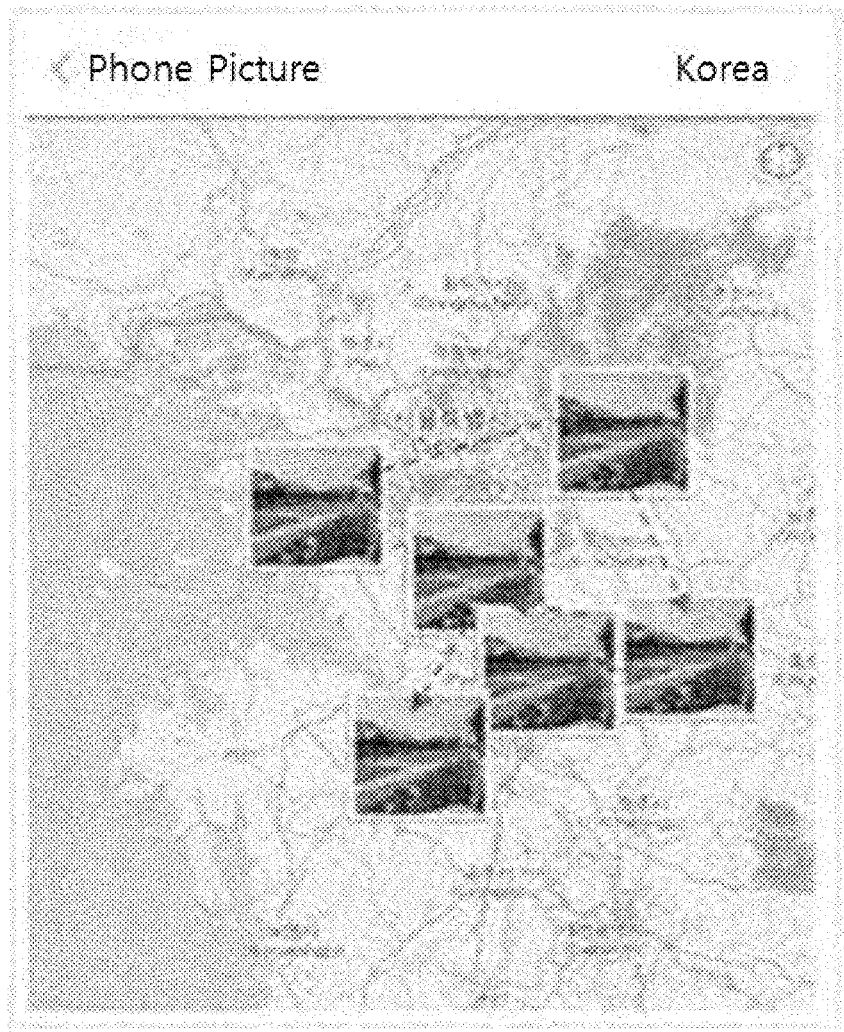
FIG. 8 is a conceptual explanatory diagram illustrating sharing registered multimedia contents along a course of an electronic map according to an exemplary embodiment of the present invention.
Figure 9:
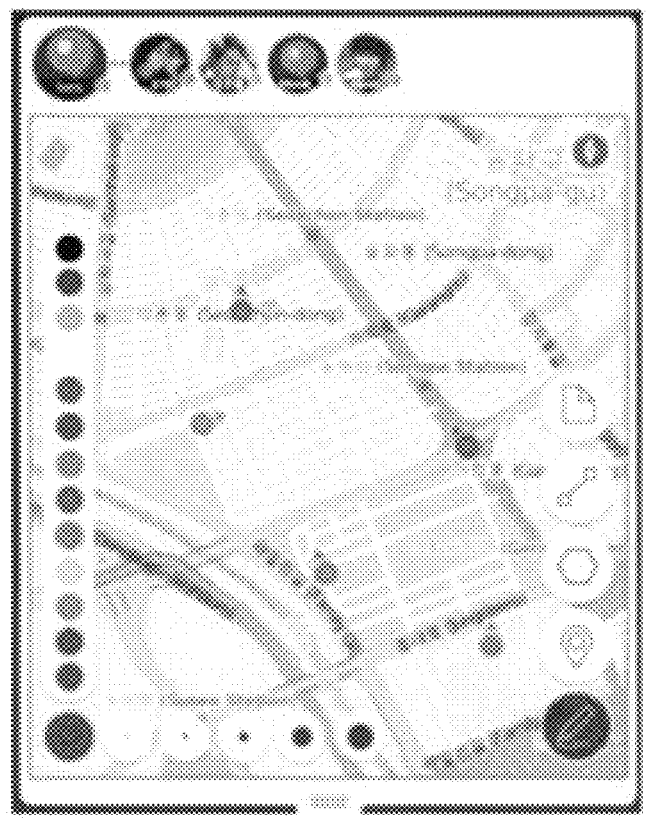
FIG. 9 is a conceptual explanatory diagram illustrating real-time sharing contents input in a map in which a center position and a magnification reduction level are the same through various interfaces according to an exemplary embodiment of the present invention.
Figure 10:
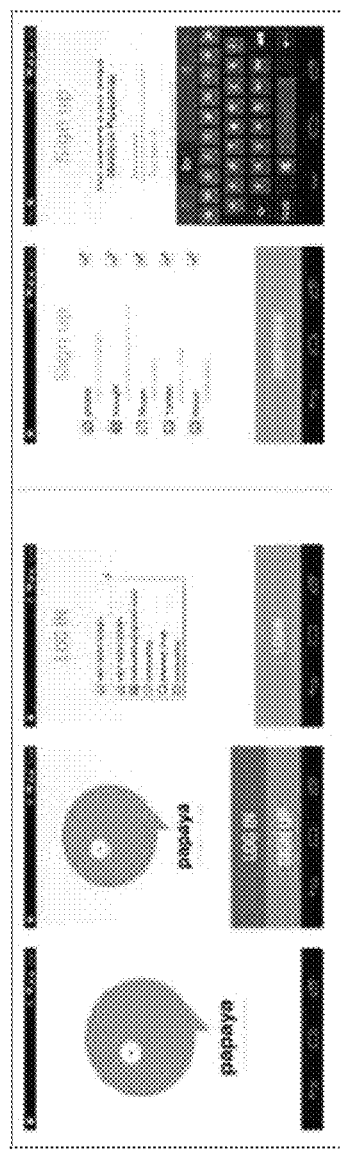
FIG. 10 is a conceptual explanatory diagram illustrating registering and using other linked communication medium or application program according to an exemplary embodiment of the present invention.
Figure 11:
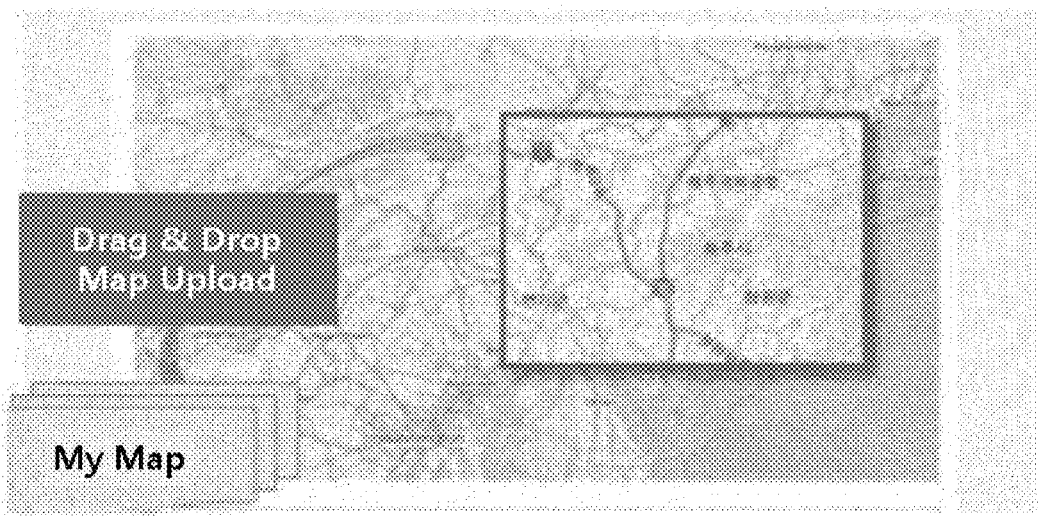
FIG. 11 is a conceptual explanatory diagram illustrating a map having a different magnification ratio in a specific location of an electronic map in a link state according to an exemplary embodiment of the present invention.

FIG. 8 is a conceptual explanatory diagram illustrating sharing registered multimedia contents along a course of an electronic map according to an exemplary embodiment of the present invention, FIG. 9 is a conceptual explanatory diagram illustrating real-time sharing contents input in a map in which a center position and a magnification/reduction level are the same through various interfaces according to an exemplary embodiment of the present invention, FIG. 10 is a conceptual explanatory diagram illustrating registering and using other linked communication medium or application program according to an exemplary embodiment of the present invention, and FIG. 11 is a conceptual explanatory diagram illustrating a map having a different magnification ratio in a specific location of an electronic map in a link state according to an exemplary embodiment of the present invention.

Hereinafter, when the accompanying drawings are described in detail, in FIG. 8, a concept (it is characterized in that an interaction result experienced by the user at a specific location is provided in connection with one content, the interaction result is shared) of providing a technology that records and stores information acquired or secured by a user at a selected location of the electronic map along a path of tracking or a tour as multimedia contents of a memory, and like and shares the corresponding information.

Further, since provided is a technology in which the user sets (designs) the path, connects, writes, registers multimedia contents including a photo, a voice, an image, and the like every primary point, location, or point on the designed path and shares the multimedia contents as separate contents, that is, various contents according to the location and a time sequence, a concept that may easily determine the corresponding path like one consecutive flow is described.

Meanwhile, a map result may be shared by communication parties or a designed map may be provided to or shared by other separately designated counterpart.

When FIG. 9 which is accompanied is described in detail, the same map (the same level and center location) is shared with one or more communication counterparts in real time and information secured while including the location mark, the scribbling, the memo, and the image which the slave mobile terminal including the user or the counterpart inputs through various interfaces is shared and verified in real time through the shared map.

When FIG. 10 is described in detail, in the case where the slave mobile terminal is registered as a sharing target member, an application (call map) or a communication medium which is being used is registered to enable the communication through the corresponding communication medium and when the corresponding use communicates with other slave mobile terminal (sharing target) or user, the communication is selected and processed to be performed through the registered communication medium or application.

When FIG. 11 is described in detail, maps at different levels (magnification ratios) are inserted into a specific location (point) of the map in link with each other.

Meanwhile, the present invention provides a technology that records and stores, provides, and share information acquired or known by the user at the selected location of the map while communicating with the counterpart through a phone call, an instant message service, the e-mail, the SNS, and the like as contents including the memo, and the like (it is characterized in that since the interaction result experienced by the user at the specific location is connected and provided as one content, the interaction result is shared).

Further, since provided is a technology in which the user sets (designs) the path according to a specific purpose (climbing, fishing, tour, exploration of remains, and the like), connects, writes, registers contents (a photo, character description, a voice file, and the like) every primary point on the designed path and shares the multimedia contents as separate contents (various contents according to the location and a time sequence, the corresponding path may be easily determined like one consecutive flow).

In addition, a map result may be shared by communication parties or a designed map may be provided to or shared by other separately designated counterpart. Further, after transferring the information on the map path, added or complemented contents need to be transferred.

Hereinabove, detailed examples of the present invention have been described in detail, but it is apparent to those skilled in the art that various changes and modifications can be made within the scope of the technical spirit of the present invention and it is natural that the changes and modifications are belong to the accompanying claims.

What is claimed is:

1. An operating method of a system of real-time sharing scribbling tracking course information based on a map, which includes a master mobile terminal, a communication network, a map information server, a tracking memo information server, a communication path management server, a slave mobile terminal, and a mobile communication system server, the operating method comprising:
   a first step of configuring scribbling tracking app installed in the master mobile terminal and operating a scribbling tracking service included in the scribbling tracking app;
   a second step of determining a start point and an arrival point of a scribbling tracking course generated by the master mobile terminal and searching, recording, and storing and outputting the scribbling tracking course information to be displayed on the scribbling tracking course;
   a third step of designating, when the scribbling tracking course information is shared with the slave mobile terminal in real time, the slave mobile terminal of a group view target and designating each slave mobile terminal so as to be connected to a communication path of a medium preferred or registered by each slave mobile terminal, and registering master candidate lists to be switched to the master mobile terminal among the slave mobile terminals in an order of a support target and a designation target and recording and managing the master candidate lists in an allocated region of the tracking memo information server, a fourth step of operating and executing a tracking information routine when it is determined that the scribbling tracking course is started by the master mobile terminal; and
   a fifth step of converting tracking section memo information recorded in the scribbling tracking section into a section memo information frame and managing the corresponding section memo information frame by a unit of a file when it is determined that a scribbling tracking is completed by the master mobile terminal and transmitting the corresponding section memo information frame to a sharing group target via a communication path by each designated medium, wherein the designated slave mobile terminal generates new tracking section memo information and additionally writes the generated tracking section memo information.

2. The operating method of claim 1, further comprising:
   a sixth step of operating the scribbling tracking course search routine when the scribbling tracking course is not generated by the master mobile terminal.

3. The operating method of claim 2, wherein the tracking information routine includes:
   activating and driving a GPS unit, an LBS unit, and an INS unit by the master mobile terminal and configuring coordinate information computed to reach a center location of the output map information and transmitting the coordinate information to the group view target with a designated magnification and sharing the coordinate information with the group view target:
   separating, when the slave mobile terminal included in the group view target selects an alone-view, the alone-view from a group view and requesting the map information of the scribbling tracking course to the map information server so as to be searched in an alone-view mode;
   perforating the tracking and sharing the tracking in real time while moving from the start point to the arrival point of the scribbling tracking course by the master mobile terminal and recording multimedia contents including a scribbling, a recording, a memo, and an image in link with the coordinate information and a summarized thumb nail image;
   transmitting when the information recorded by the master mobile terminal is intended to be transmitted to a sharing group, recorded information stored in each designated communication medium of the sharing target; and
   designating, when the scribbling tracking app counts that a first allowance time elapsed after a final access time when the master mobile terminal inputs a control signal, a secondary sharing target of the master candidate list as a master and ending the tracking information routine.

4. The operating method of claim 2, wherein the scribbling tracking course search routine includes:
   searching and selecting, when the scribbling tracking course search routine is described in detail, the scribbling tracking course information registered and managed in the tracking memo information server by the master mobile terminal and automatically adjusting and setting a level of a scale so that a total length of the selected scribbling tracking course is analyzed and the total length is wholly displayed in one multi input/output unit;
   selecting and adjusting, when the level set by the master mobile terminal is adjusted, the level of the scale adjusted as a predetermined value and reproducing the information of the scribbling tracking course at a predetermined double-speed;
   clicking, when the tracking information is evaluated by the master mobile terminal, a displayed recommendation button and inputting a recommendation memo;
   linking and driving, when temporary play/stop is set by the master mobile terminal, a search engine which searches a periphery of the scribbling tracking course at a slopped location for each category;
   computing and outputting, when a distance of a predetermined section included in the scribbling tracking course is searched by the master mobile terminal, a path, a time, and a distance depending on moving means between a first location and a second location which are designated and input;

overlapping and displaying, when the master mobile terminal intends to magnify and display a specific region, a map of a magnification extended twice or more around coordinate information of a designated location; and selectively inputting, when the master mobile terminal inputs the tracking memo information in the specific region, multimedia contents information and blog information and overlapping and recording the input information to be temporally divided.

* * * * *